US012531101B2

(12) United States Patent
Kitagawa

(10) Patent No.: US 12,531,101 B2
(45) Date of Patent: Jan. 20, 2026

(54) WORD LINE VOLTAGE CONTROL FOR REDUCED VOLTAGE DISTURBANCE DURING MEMORY OPERATIONS

(71) Applicant: Micron Technology, Inc., Boise, ID (US)

(72) Inventor: Makoto Kitagawa, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 119 days.

(21) Appl. No.: 18/524,708

(22) Filed: Nov. 30, 2023

(65) Prior Publication Data

US 2024/0212735 A1    Jun. 27, 2024

Related U.S. Application Data

(60) Provisional application No. 63/434,596, filed on Dec. 22, 2022.

(51) Int. Cl.
*G11C 11/22* (2006.01)

(52) U.S. Cl.
CPC ........ *G11C 11/2257* (2013.01); *G11C 11/221* (2013.01); *G11C 11/2255* (2013.01); *G11C 11/2273* (2013.01); *G11C 11/2275* (2013.01)

(58) Field of Classification Search
CPC .............. G11C 11/2257; G11C 11/221; G11C 11/2255; G11C 11/2273
See application file for complete search history.

(56) References Cited

U.S. PATENT DOCUMENTS

| 11,749,329 | B1 | 9/2023 | Kitagawa | |
|---|---|---|---|---|
| 2011/0013458 | A1* | 1/2011 | Seol | H10B 41/20 365/189.04 |
| 2014/0140130 | A1* | 5/2014 | Song | G11C 16/08 365/185.23 |
| 2019/0043595 | A1 | 2/2019 | Vimercati et al. | |

* cited by examiner

*Primary Examiner* — Han Yang
(74) *Attorney, Agent, or Firm* — Fletcher Yoder, P.C.

(57) ABSTRACT

A memory cell may include a capacitor and a switch. Accessing the memory cell in a memory array of a memory device may include applying a word line voltage to the switch to electrically couple the capacitor to a data line. However, if not compensated for, applying the word line voltage may induce undesired voltages on adjacent memory cells of the memory arrays. Systems and methods are described to reduce an effect of one or more parasitic capacitors causing the undesired voltage disturbance. For example, the memory array may provide compensatory voltages to adjacent word lines of a target word line to compensate for such undesired parasitic capacitors. Accordingly, an undesired voltage disturbance of the memory cells may be reduced.

20 Claims, 6 Drawing Sheets

WORD LINE VOLTAGE CONTROL FOR REDUCED VOLTAGE DISTURBANCE DURING MEMORY OPERATIONS

CROSS-REFERENCE TO RELATED APPLICATIONS

This application claims priority to U.S. Provisional Application No. 63/434,596, filed Dec. 22, 2022, entitled "WORD LINE VOLTAGE CONTROL FOR REDUCED VOLTAGE DISTURBANCE DURING MEMORY OPERATIONS," which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

The following relates generally to memory devices and more specifically to charge distributions of memory cells of a memory device. The techniques and methods described herein may be used with ferroelectric memory devices or other types of memory devices.

Memory devices are widely used to store information in various electronic devices such as computers, wireless communication devices, cameras, digital displays, and the like. Information is stored by programming different states on memory cells of a memory device. For example, binary devices have two states, often denoted by a logic "1" or a logic "0." In other systems, more than two states may be stored. To access the stored information, the electronic device may read, or sense, the stored state on the memory cells of the memory device. To store information, the electronic device may write, or program, the state in the memory device. If not compensated for, sensing or programming targeted memory cells of the memory device may disturb a charge level of one or more untargeted adjacent memory cells.

BRIEF DESCRIPTION OF THE DRAWINGS

Various aspects of this disclosure may be better understood upon reading the following detailed description and upon reference to the drawings in which.

DETAILED DESCRIPTION

Figure 1:
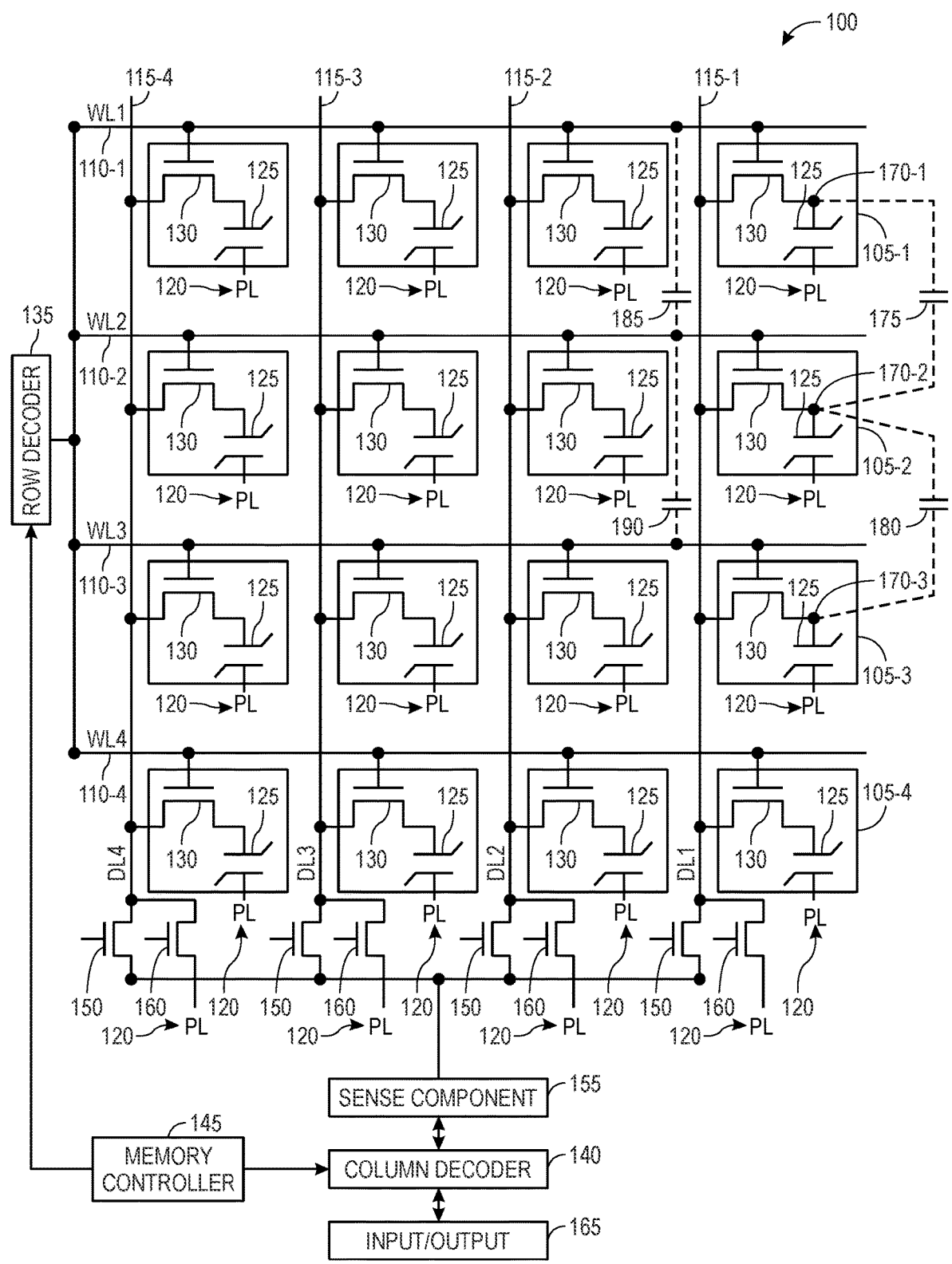
FIG. 1 is a memory array, in accordance with an embodiment of the present disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A memory device may include a number of memory arrays including a ferroelectric memory array. Every memory array, such as a ferroelectric memory array includes a number of memory cells. The memory cells of a ferroelectric memory array are arranged between a number of word lines and data lines on a shared plate line. For example, each memory cell is disposed at an intersection of a word line and a data line. Moreover, each memory cell is coupled to the shared plate line. Furthermore, each memory cell may include a ferroelectric capacitor, hereinafter referred to as a capacitor, and a switch.

A switch of a memory cell in a ferroelectric memory array may couple to a capacitor of the memory cell on a first side of the switch, couple to a word line on a second side of the switch, and couple to a data line on a third side of the switch. The switch may short a connection between the capacitor and the data line when a voltage of the word line is high (e.g., the word line is selected). In some embodiments, the switch may include a transistor where the word line is coupled to a gate of the transistor to control a connection between the capacitor and the data line.

A target memory cell may be written to in a writing operation or may be read from in a reading operation based on applying a sensing voltage or a programming voltage to the plate line or a target data line and applying a selection voltage to a target word line. Moreover, a ferroelectric memory cell may be written to or may be read from based on a high sensing biasing scheme or a low sensing biasing scheme. Based on performing the high sensing biasing scheme or the low sensing biasing scheme, the target memory cell may be written to or read from by applying different sensing voltages and different programming voltages to the plate line or the target data line. In some cases, the target word line is selected by providing a single selection voltage (e.g., enable voltage, a high voltage) thereto when performing the high sensing biasing scheme or the low sensing biasing scheme. In any case, a switch of the target memory cell may short a connection between a capacitor of the target memory cell and the target data line coupled to the target memory cell when the target word line is selected.

A row decoder of the ferroelectric memory array may apply the selection voltage to the target word line. Moreover, a column decoder of the ferroelectric memory array may apply the sensing/programming voltages to the target data line. For simplicity, the column decoder is referred to for also applying the sensing/programming voltages to the plate line hereinafter. However, it should be appreciated that any viable circuitry may apply the sensing/programming voltages to the plate line.

The column decoder may apply the sensing voltages to sense a memory state of the target memory cell. Moreover, the column decoder may apply the programming voltages to program a memory state on the target memory cell. Each memory state may correspond to a distinct distribution of charges stored on the memory cells of the ferroelectric memory array. For example, the charge distribution may correspond to each polarity of a dipole charge distribution, or an intermediary charge distribution of the dipole charge distribution, among other possible charge distributions. The memory states of the target memory cell may, at least, include a first memory state corresponding to a first stored value on the target memory cell (e.g., logic 0) and a second memory state corresponding to a second stored value on the target memory cell (e.g., logic 1).

Writing a target memory state in a ferroelectric memory array may include sensing a charge distribution currently stored on a target memory cell to determine a current memory state of the target memory cell. Subsequently, in different cases, writing the target memory state on the target memory cell may or may not include programming the target memory state based on the current memory state of the target memory cell and whether sensing the memory state is destructive. For example, writing the target memory state may include programming the target memory cell when a resulting memory state of the target memory cell after sensing the memory state is different from the target memory state. Moreover, reading a memory state of a target memory cell in a ferroelectric memory array may also include sensing the memory state of the target memory cell. When sensing the memory state of the target memory cell is destructive, reading the memory state of the target memory cell may include re-programming the memory state.

As mentioned above, sensing and programming the memory state of the target memory cell may include applying a sensing voltage or a programming voltage to a target data line or the plate line while applying a selection voltage to a target word line. As mentioned above, the switch of the target memory cell may couple the capacitor to the target data line when the target word line is selected. As such, the row decoder may apply the selection voltage (e.g., near 1 volts (V), near 1.5 V, near 3 V, near 5 V, and so on) to the target word line to extract (e.g., sense) the stored charges of the capacitor to the target data line. The capacitor may also receive the sensing/programming voltages of the target data line or the plate line when the word line is receiving the selection voltage.

During a sensing operation, the capacitor of the target memory cell may discharge the stored charges based on receiving the selection voltage and the sensing voltage. The discharged electrical charges of the capacitor may induce a voltage change on the voltage of the target data line. In some embodiments, a sense component of the ferroelectric memory array may determine the induced voltage change on the target data line. For example, the sense component may determine a sensed voltage present on the target data line and receive a reference voltage such as the sensing voltage applied to the data line or the plate line. Moreover, the sense component may compare the reference voltage with the sensed voltage to determine the induced voltage change.

As such, the sense component may determine (e.g., sense) the memory state of the target memory cell based on the voltage change induced by the extracted charges. For example, a first voltage change value may correspond to a first memory state of the target memory cell (e.g., logic 0) and a second voltage change value may correspond to a second memory state of the target memory cell (e.g., logic 1).

With the foregoing in mind, a voltage difference between the target memory cell and adjacent memory cells of the ferroelectric memory array during the sensing operation may cause undesired voltage disturbance between the target memory cell and the adjacent memory cells. In particular, applying the selection voltage to the target word line may cause forming parasitic capacitors between the target memory cell and the adjacent memory cells coupled to non-selected and adjacent word lines. If not compensated for, the parasitic capacitors may cause undesired voltage disturbance in the target memory cell, in the adjacent memory cells, or both. In some cases, such voltage disturbance may cause erroneous memory operations.

To reduce the effect of the parasitic capacitors, the row decoder may apply one or more compensatory voltages to the adjacent word lines to reduce the voltage disturbance. In particular, the row decoder may apply the compensatory voltages to induce parasitic capacitance between the adjacent word lines and the target word line having an opposite effect compared to the undesired parasitic capacitance between the adjacent memory cells and the target memory cell. For example, the row decoder may apply a reference voltage (e.g., zero or near zero voltage) to non-elected remaining word lines of the ferroelectric memory array. Moreover, the row decoder may apply increased or decreased voltages compared to the reference voltage to the adjacent word lines to induce the compensatory parasitic capacitance to reduce the voltage disturbance.

Accordingly, the memory device may sense and program target memory cells with higher reliability and reduced error rate. In different embodiments, the row decoder may include different circuitry to provide the selection voltage, one or more compensatory voltages, and the reference voltage. Moreover, the memory controller may provide one or more control signals indicative of providing the selection voltage to the target word line, the compensatory voltages to the adjacent word lines, and the reference voltage to the remaining word lines.

Referring now to FIG. 1, a memory device 95 including a ferroelectric memory array 100 (e.g., a ferroelectric memory array), hereinafter referred to as a memory array 100, is illustrated in accordance with various examples of the present disclosure. The memory array 100 supports reading operations and writing operations in a memory device. For example, an electronic device may include such memory device including the memory array 100. As such, the memory array 100 may include a portion of such memory device and/or electronic device. The memory array 100 includes a number of memory cells 105 (e.g., 105-1, 105-2, 105-3, 105-4) each coupled to a respective word line 110 (e.g., 110-1, 110-2, 110-3, 110-4), a respective data line 115 (e.g., 115-1, 115-2, 115-3, 115-4), and a plate line 120.

In the depicted embodiment, a portion of the memory array 100 is illustrated including four word lines 110 (e.g., WL1, WL2, WL3, WL4) and four data lines 115 (e.g., DL1, DL2, DL3, DL4). A total number of the word lines 110 and the data lines 115 depends on a size of the memory array 100. The word lines 110 and the data lines 115 are made of conductive materials. For example, word lines 110 and data lines 115 may be made of metals (such as copper, aluminum, gold, tungsten, etc.), metal alloys, other conductive materials, or the like. Each row of the memory cells 105 is connected to a single word line 110, and each column of the memory cells 105 is connected to a single data line 115.

The memory cells 105 are each programmable to store a memory state. For example, the memory cells 105 may each include a capacitor 125 (e.g., storage device) and a switch 130. The word lines 110 are coupled to and may control the switches 130 of the memory cells 105. For example, the switches 130 may electrically isolate the capacitors 125 of the respective memory cells 105 from the data lines 115. In some embodiments, the switches 130 of the memory cells 105 may include a MOSFET where the word lines 110 may be coupled to the gate of the MOSFET. In such embodiments, targeting (e.g., activating, selecting) one or more of the word lines 110 may result in an electrical connection or closed circuit between the capacitors 125 of the memory cells 105 that are coupled to the target word lines 110 and the respective data lines 115. In additional or alternative cases, the switches 130 of the memory cells 105 may include any other viable switching circuit (e.g., any type of transistors, logic circuits, among other things).

The capacitors 125 may include a ferroelectric as the dielectric material to store charge levels representative of the programmable memory states. Example ferroelectric materials may include barium titanate ($BaTiO_3$), lead titanate ($PbTiO_3$), lead zirconium titanate (PZT), and strontium bismuth tantalate (SBT). The capacitors 125 described herein may include these or other ferroelectric materials. Electric charge distribution within a ferroelectric capacitor may result in accumulation of a net charge at the ferroelectric material's surface that attracts opposite charge through the capacitor terminals. Thus, the respective charge is stored at the interface of the ferroelectric material and the capacitor terminals.

In some embodiments, ferroelectric material may maintain an electric charge distribution in the absence of an electric field. For example, the ferroelectric material may maintain a positive, negative, or in some cases a neutral charge at neutral voltage. The ferroelectric material may realize such electric charge levels by receiving a respective programming or sensing voltage. The respective sensing voltage levels may be applied according to hysteresis curves, as will be appreciated.

In any case, the memory cells 105 may be read or written by applying a voltage across the respective capacitors 125. For example, sensing or programming a target memory cell 105-2 includes applying a sensing voltage or programming voltage, respectively, to the data line 115-1 or the plate line 120 while providing a selection voltage (e.g., a high voltage) to the word line 110-2 (e.g., selecting the word line 110-2). During a sensing operation, a sense component 155 may sense the charge distribution and therefore the memory state of the capacitor 125 of the memory cell 105-2. For example, the sense component 155 may determine induced voltages of the capacitor 125 to the data line 115-1 based on applying the sensing voltage. Moreover, during a programming operation, the capacitor 125 of the target memory cell 105-2 may store charges indicative of a desired charge distribution and therefore a desired memory state.

Sensing the charge distribution stored on the memory cells 105 may be controlled through the row decoder 135 and the column decoder 140. A memory controller 145 may provide control signals (e.g., instructions) to switches 150 to couple the data lines 115 to the column decoder 140 and/or the sense component 155. In some cases, the memory controller 145 may also provide control signals to switches 160 to couple the data lines 115 to the plate line 120. Accordingly, the memory controller 145 may control floating a voltage of non-selected memory cells 105 as well as providing the sensing voltage and/or the programming voltage to the target memory cell 105-2.

In some embodiments, the memory array 100 may include the sense component 155 and/or the memory controller 145. In alternative or additional embodiments, the memory device 95 may include the memory array 100 coupled to the sense component 155 and/or the memory controller 145. In yet alternative or additional embodiments, an electronic device may include the memory device 95 coupled to the sense component 155 and/or the memory controller 145.

In any case, the memory controller 145 may provide the control signals to the switches 150 and/or 160 to couple the data line 115-1 of the target memory cell 105-2 to the column decoder 140. As such, the column decoder 140 may apply the sensing voltage (or the programming voltage) to the data line 115-1 based on receiving a column address of the target memory cell 105-2 from the memory controller 145. Alternatively or additionally, the column decoder 140, or any other viable circuitry, may apply the sensing voltage to the plate line 120. In any case, the column decoder 140 may provide a differential voltage across the capacitor 125 of the target memory cell 150-2 based on applying the sensing voltage (or the programming voltage). For example, the column decoder 140 may apply the sensing voltage based on receiving an input 165 indicative of sensing a current memory state of the target memory cell 105-2 and/or other memory cells 105.

As such, sensing (or programming) the target memory cell 105-2 may include measuring the induced voltage of the capacitor 125 on the data line 115-1 when applying the sensing voltage across the capacitor 125 of the target memory cell 105-2. Moreover, the capacitors 125 of the memory cells 105 coupled to the remaining data lines 115-2, 115-3, and 115-4 may receive the voltage of the plate line 120 on both sides to become virtually grounded. Similarly, the row decoder 135 may select the word line 110-2 by providing a selection voltage (e.g., 4 V, 4.5 V, 5 V, 5.5 V, and so on) to the word line 110-2 based on receiving a row address of the target memory cell 105-2 from the memory controller 145.

In some embodiments, the row decoder 135 may also provide a compensatory voltage (e.g., 0.3 V, 0.5 V, 0.6 V, 0.8V, and so on) to adjacent word lines 110-1 and 110-3 during a sensing operation and/or a programming operation of the target memory cell 105-2. For example, the memory controller 145 may provide the control signals to the row decoder 135 to provide the selection voltage to the target word line 110-2 and provide the compensatory voltage to the adjacent word lines 110-1 and 110-3 when the memory cell 105-2 is targeted. In the depicted embodiment, the row decoder 135 may provide a reference voltage to the remaining word line 115-4 during the sensing/programming operation of the target memory cell 105-2. In alternative or additional embodiments where the memory array 100 includes additional word lines 115, the row decoder 135 may also provide the reference voltage to such additional remaining word lines 115 during the sensing/programming operation of the target memory cell 105-2.

The row decoder 135 may apply the compensatory voltage to the adjacent word lines 110-1 and 110-3 to reduce an undesired parasitic capacitance between the target memory cell 105-2 and the adjacent memory cells 105-1 and 105-3. As mentioned above, if not compensated for, selecting a memory cell 105 may cause forming undesired parasitic capacitors with adjacent memory cells 105 that are coupled to a same data line 115. For example, selecting the target memory cell 105-2 may cause forming undesired parasitic capacitors with the adjacent memory cells 105-1 and 105-3 that are coupled to the data line 115-1.

In the depicted embodiment, if not compensated for, selecting the target memory cell 105-2 may cause forming a first undesired parasitic capacitor 175 between a storage node 170-1 of the adjacent memory cell 105-1 and a storage node 170-2 of the target memory cell 105-2. Similarly, selecting the target memory cell 105-2 may cause forming a second undesired parasitic capacitor 180 between the storage node 170-2 and a storage node 170-3 of the adjacent memory cell 105-3.

Formation of the undesired parasitic capacitors 175 and 180 may cause voltage disturbance at the storage nodes 170-1, 170-2, and/or 170-3 of the memory cells 105-1, 105-2, and/or 105-3. As such, the row decoder 135 may apply the compensatory voltage to the adjacent word lines 110-1 and 110-3 to induce compensatory parasitic capacitors 185 and 190 for reducing the voltage disturbance. In different cases, the compensatory voltage may have a voltage value higher or lower than the reference voltage to provide a compensatory parasitic capacitance effect, as will be appreciated.

In any case, the sense component 155 may determine the stored memory state of the memory cells 105. For example, the sense component 155 may receive or sense a voltage present on the data line 115-1 when sensing the target memory cell 105-1. Moreover, the sense component 155 may receive or sense a sensing voltage or the programming voltage provided to the target memory cell 105-1, for example, from the column decoder 140. The sense component 155 may compare the sensing voltage or the programming voltage with the voltage present on the data line 115-1 to determine the stored memory state of the respective memory cell 105.

The sense component 155 may include various transistors or amplifiers in order to detect and amplify a difference in the received or sensed signals, which may be referred to as latching. The sense component 155 may provide an indication of the sensed memory state of the memory cells 105 through the column decoder 140 as output 165.

For example, when the word line 110-2 is selected, applying the sensing voltage to the data line 115-1 may extract the stored charges on the capacitor 125 of the target memory cell 105-2 onto the data line 115-1. Moreover, discharging the capacitor 125 of the target memory cell 105-2 may induce a change in the voltage present on the data line 115-1. The sense component 155 may determine a value of the voltage change based on comparing a sensed voltage present on the data line 115-1 with the sensing voltage. Moreover, the sense component 155 may determine the stored memory state on the target memory cell 105-1 based on comparing the voltage change to one or more voltage change thresholds.

The memory controller 145 may control the operations (e.g., read, write, re-write, refresh, etc.) of the memory cells 105 through the various components, such as the row decoder 135, the column decoder 140, and the sense component 155. The memory controller 145 may generate row and column address signals in order to activate the desired word line 110 and data line 115. For example, in some cases, the input 165 may be coupled to the memory controller 145 to provide an indication of the row and column address signals to the memory controller 145. Moreover, the memory controller 145 may generate various other control signals to perform different operations. For example, the memory controller 145 may generate one or more control signals to control providing the compensatory word line voltage to the adjacent word lines 110-1 and 110-3 when sensing the memory state of the target memory cell 105-2.

The memory controller 145 may also provide and control various voltage levels used during the operation of the memory array 100. In general, the amplitude, shape, or duration of an applied voltage discussed herein may be adjusted or varied and may be different for the various operations for operating the memory array 100. Furthermore, one or multiple memory cells 105 within the memory array 100 may be accessed simultaneously; for example, multiple memory cells 105 of the memory array 100 may be accessed simultaneously during a reset operation in which a group of the memory cells 105 or all the memory cells 105 are set to a single memory state.

Figure 2:
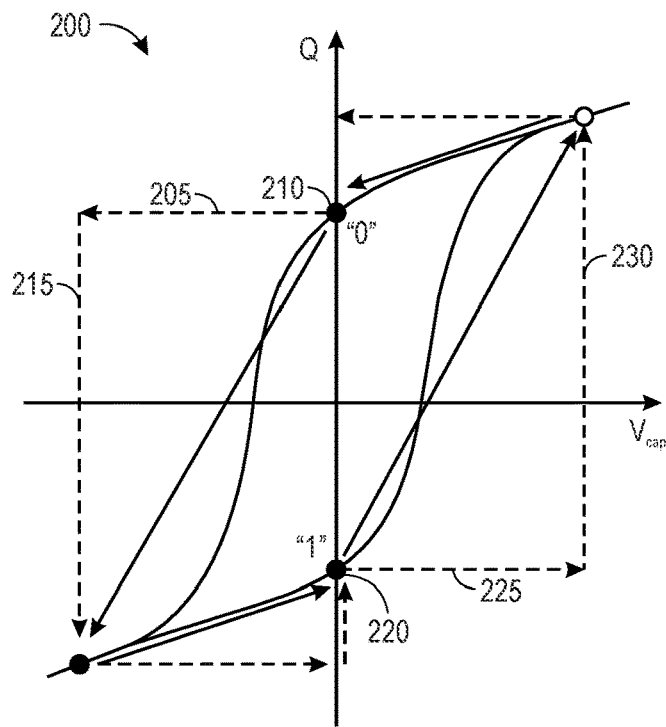
FIG. 2 illustrates a hysteresis curve for destructively sensing a memory cell of the ferroelectric memory array of FIG. 1, in accordance with an embodiment of the present disclosure.
Figure 3:
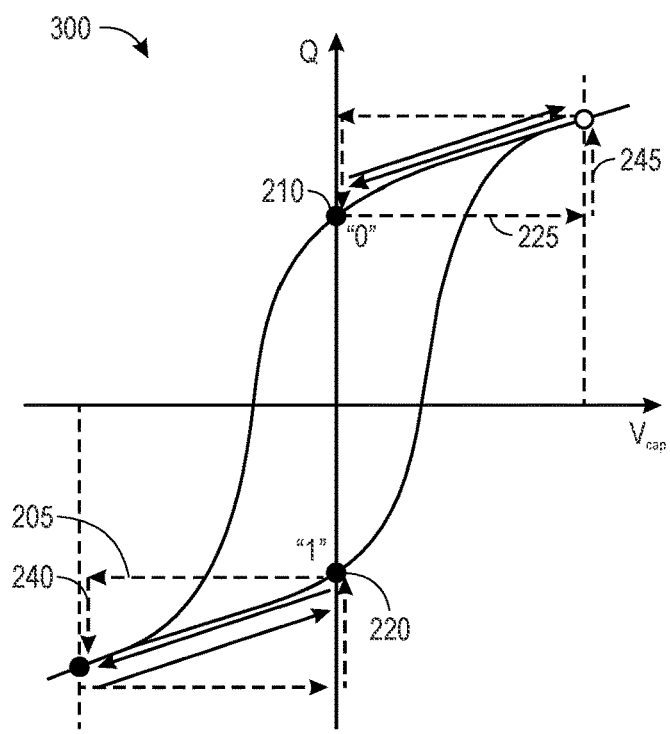
FIG. 3 illustrates a hysteresis curve for non-destructively sensing a memory cell of the ferroelectric memory array of FIG. 1, in accordance with an embodiment of the present disclosure.

FIGS. 2 and 3 illustrate hysteresis curves 200 and 300 for sensing or programming a memory state of the memory cells 105 that include the capacitor 125 with the ferroelectric dielectric material. The hysteresis curves 200 and 300 may illustrate patterns of charge accumulation and extraction by the capacitors 125 when applying different voltage levels across the memory cells 105. In particular, the hysteresis curves 200 and 300 may illustrate examples of destructive sensing operation, non-destructive sensing operation, or programming operation using a high biasing scheme and a low biasing scheme, as will be appreciated.

Referring to the hysteresis curve 200 of FIG. 2, the high biasing scheme is based on applying a voltage 205 across the capacitors 125 (e.g., $V_{CAP}$) to extract the stored charges of the capacitors 125. By way of example, the hysteresis curve 200 of FIG. 2 may depict a positive charge 210 initially stored on the capacitor 125 of the target memory cell 105-2 at a neutral voltage. In the depicted embodiment, the positive charge 210 represents a logic 0 value stored on the target memory cell 105-2. Applying the voltage 205 across the capacitor 125 may extract first extracted charges 215.

For example, the memory controller 145 may provide one or more control signals to the row decoder 135 and/or the column decoder 140 to apply the voltage 205 across the capacitor 125. As such, the column decoder 140 may provide a data line voltage to the data line 115-1 coupled to the capacitor 125 of the target memory cell 105-2 when the word line 110-2 is selected by the row decoder 135. Extracting the first extracted charges 215 may induce a first voltage change on the data line 115-1.

Subsequently, the capacitor 125 may follow the hysteresis curve 200 to a negative charge 220 when the voltage 205 is removed across the capacitor 125. Such operation may be referred to as a destructive sensing operation or a programming operation when the target memory cell 105-2 is initially storing a logic 0 value. The negative charge 220 represents a logic 1 value stored on the target memory cell 105-2.

During a destructive sensing operation, the memory controller 145 may subsequently provide one or more control signals to re-write the initial logic 1 value to the capacitor 125 based on the low biasing scheme. For example, the memory controller 145 may provide the one or more control signals to the row decoder 135 and/or the column decoder 140 to re-write the initial logic 1 value to the capacitor 125. Alternatively or additionally, the memory controller 145 may provide the control signals to perform a programming operation using a the low biasing scheme.

The low biasing scheme is based on applying a voltage 225 across the capacitors 125 (e.g., $V_{CAP}$) to accumulate first accumulated charges 230 on the capacitors 125. As such, the column decoder 140 may provide the voltage 225 to the data line 115-1 coupled to the capacitor 125 of the target memory cell 105-2 initially storing the negative charge 220. Accumulating the first accumulated charges 230 may induce a second voltage change on the data line 115-1.

Subsequently, the capacitor 125 may follow the hysteresis curve 200 to the positive charge 210 when the voltage 225 is removed across the capacitor 125. Similarly, such operation may be referred to as a destructive sensing operation or a programming operation when the target memory cell 105-2 is initially storing a logic 0 value. For example, the high biasing scheme sensing operation and the low biasing scheme programming operation may be performed consecutively in a destructive sensing operation based on the initial memory state of the target memory cell 105-2.

Referring now to the hysteresis curve 300 of FIG. 3, non-destructive sensing of the capacitor 125 of the target memory cell 105-2 is shown. The non-destructive sensing is based on the high biasing scheme when the capacitor 125 of the target memory cell 105-2 is initially storing the negative charge 220 at neutral voltage. In the depicted embodiment, applying the voltage 205 across the capacitor 125 may extract second extracted charges 240 form the capacitor 125. Extracting the second extracted charges 240 may induce a third voltage change on the data line 115-1. However, the second extracted charges 240 may include less extracted charges compared to the first extracted charges 215 of the hysteresis curve 200 discussed above and shown in FIG. 2. Accordingly, the third voltage change associated with sensing the capacitor having an initial logic 1 value may be smaller than the first voltage change associated with sensing the capacitor having an initial logic 0 value.

Moreover, the non-destructive sensing is based on the low biasing scheme when the capacitor 125 of the target memory cell 105-2 is initially storing the positive charge 210 at neutral voltage. In the depicted embodiment, applying the voltage 225 across the capacitor 125 may accumulate second accumulated charges 245 on the capacitors 125. Accumulating the second accumulated charges 245 may induce a fourth voltage change on the data line 115-1. However, the second accumulated charges 245 may include less accumulated charges compared to the first accumulated charges 230 of the hysteresis curve 200 discussed above and shown in FIG. 2.

As mentioned above, the capacitor voltage ($V_{CAP}$) in hysteresis curves 200 and 300 may represent an applied voltage difference across the capacitor 125. For example, when sensing the memory states, a first side of the capacitor 125 may receive the applied voltage (e.g., the voltage 205 or 225) from the data lines 115-1 when a second side of the capacitor 125 remains at the voltage of the plate line 120. Alternatively or additionally, the second side of the capacitor 125 may receive the applied voltage (e.g., the voltage 205 or 225) from the plate line 120. For example, the column decoder 140, or any other viable circuit, may apply the voltage 205 to the plate line 120 to apply the voltage 205 to the second side of the capacitor 125.

In some cases, a positive voltage may be realized across the capacitor 125 by applying a voltage higher than the voltage of the plate line 120 (e.g., higher than 1.5 V) to a terminal of the capacitor 125 via the data line 115-1. Similarly, a negative voltage may be realized across the capacitor by applying a voltage less than the voltage of the plate line 120 (e.g., below 1.5 V) to the same terminal of the capacitor 125 via the data line 115-1.

Figure 4:
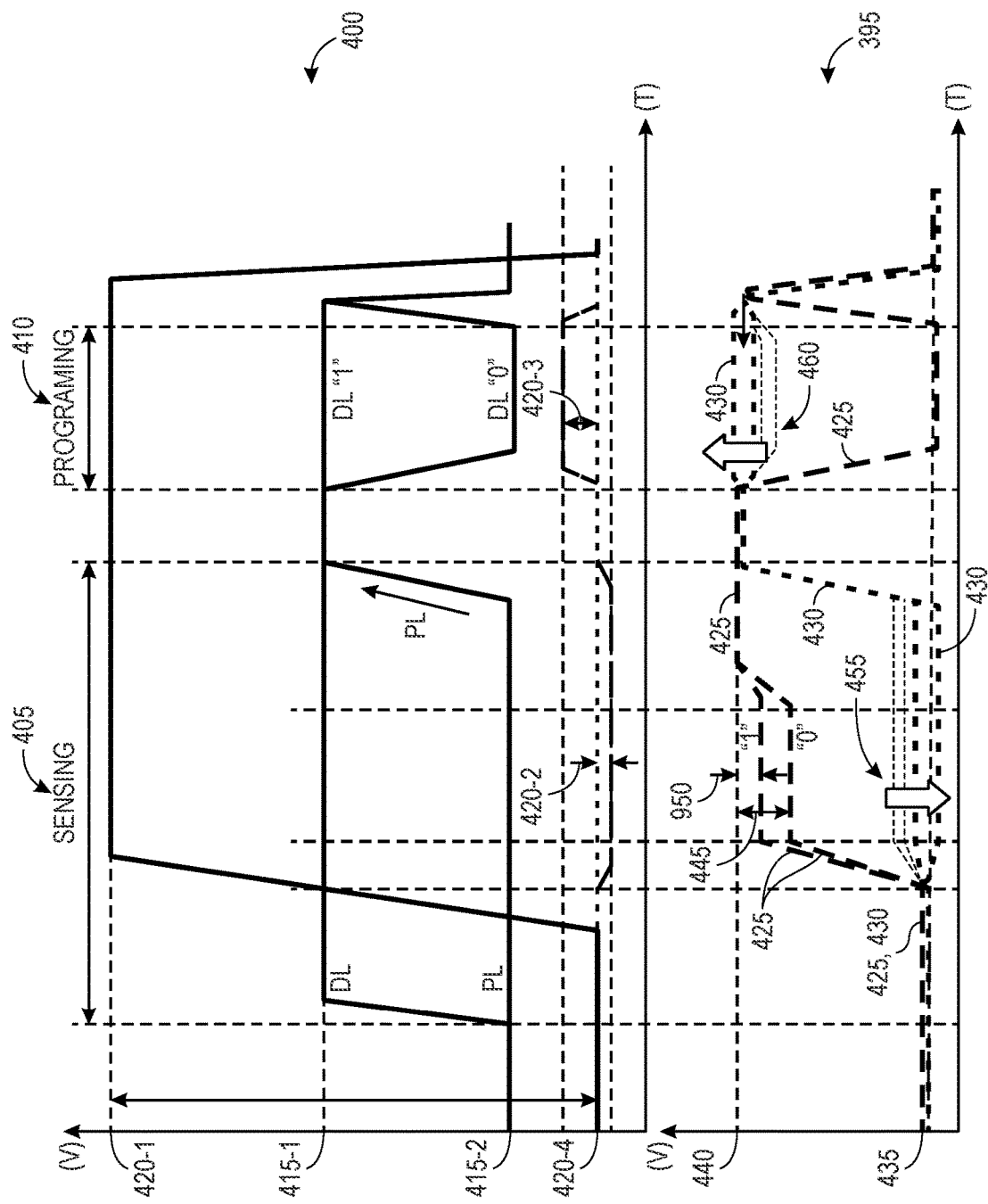
FIG. 4 depicts a graph illustrating voltage levels provided to and received from the memory array of FIG. 1 associated with a high sensing biasing scheme, in accordance with an embodiment of the present disclosure.

With the foregoing in mind, FIG. 4 depicts graphs 400 and 395 illustrating voltage levels provided to and received from the memory array 100, respectively, when targeting the memory cell 105-2. The graphs 400 and 395 are associated with the high sensing biasing scheme discussed above.

A sensing period 405 of the graphs 400 and 395 may illustrate voltage levels provided to and received from the memory array 100, respectively, when sensing a current memory state stored on the target memory cell 105-2. Moreover, a programming period 410 of the graphs 400 and 395 may illustrate voltage levels provided to and received from the memory array 100, respectively, when programming (or reprogramming) the target memory cell 105-2. For example, the illustrated consecutive sensing period 405 and the programming period 410 may be associated with a destructive sensing operation and a subsequent programming (or reprogramming) operation. It should be appreciated that the depicted embodiment is provided by the way of example. As such, in alternative or additional embodiments, the sensing period 405 and the programming period 410 may be performed with different voltage levels and/or performed individually and separately at different times.

The graph 400 depicts voltage levels provided to the word lines 110, the data lines 115, and the plate line 120 by the row decoder 135 and the column decoder 140 (or any other viable component). Moreover, the graph 395 depicts voltage levels of the storage nodes 170-1, 170-2, and 170-3 of the memory cells 105-1, 105-2, and 105-3 discussed above. For example, the sense component 155 or any other viable component may determine the storage nodes 170-1, 170-2, and 170-3.

With the foregoing in mind, the graph 395 may illustrate induced voltage changes of the storage nodes 170-1, 170-2, and 170-3 when providing the voltages depicted in the graph 400 to the target memory cell 105-2. It should be appreciated that the depicted voltage levels in the graphs 400 and 395 are provided by the way of example and are aligned with dashed lined only for correspondence and visibility. In different embodiments, the voltage levels of the storage nodes 170-1, 170-2, and 170-3 shown in the graph 395 may occur concurrent with or at different times after providing the voltage levels shown in the graph 400.

During the sensing period 405, the column decoder 140 may provide a high data line voltage 415-1 (e.g., 0.7 V, 1.5 V, 3 V, 5 V, and so on) to the data line 115-1 and a low data line voltage 415-2 (e.g., 0 V, 0.1 V, 0.2 V, 0.3 V, and so on) to the remaining data lines 115-2, 115-3, and 115-4. The high data line voltage 415-1 may correspond to the sensing voltage (or the programming voltage) described above. The column decoder 140 may also provide the low data line voltage 415-2 to the plate line 120. Accordingly, the column decoder 140 may generate a voltage difference across the capacitors 125 of the memory cells 105-1, 105-2, 105-3, and 105-4. Moreover, the column decoder 140 may float the non-selected memory cells 105 coupled to the remaining data lines 115-2, 115-3, and 115-4.

During the programming period 410, in different cases, the column decoder 140 may provide the high data line voltage 415-1 or the low data line voltage 415-2 to the data line 115-1. In particular, the column decoder 140 may provide the high data line voltage 415-1 or the low data line voltage 415-2 based on an initial value of the target memory cell 105-2 and the hysteresis curve 200 or 300 discussed above. Moreover, the column decoder 140 may follow the high biasing scheme portion of the hysteresis curve 200 or 300.

In any case, the row decoder 135 may provide a selection voltage 420-1 (e.g., 1.5 V, 3 V, 5 V, 5.5 V, and so on) to the target word line 110-2 during the sensing period 405, the programming period 410, or both. The row decoder 135 may provide the selection voltage 420-1 for sensing the current memory state stored on the target memory cell 105-2 and programming a desired memory state stored on the target memory cell 105-2. For example, the row decoder 135 may provide the selection voltage 420-1 to a gate of the switch 130 of the target memory cell 105-2 to electrically couple the capacitor 125 of the target memory cell 105-2 to the data line 115-1. Accordingly, in the illustrated embodiment, the column decoder 140 and the row decoder 135 may select the target memory cell 105-2 during the sensing period 405 and the programming period 410.

If not compensated for, in some cases, selecting the target memory cell 105-2 may cause forming the undesired parasitic capacitors 175 and/or 180 described above. As such, the row decoder 135 may provide the first compensatory voltage 420-2 and/or the second compensatory voltage 420-3 to reduce an effect of the undesired parasitic capacitors 175 and/or 180. In particular, the row decoder 135 may provide the first compensatory voltage 420-2 to the adjacent word lines 110-1 and 110-3 during the sensing period 405. Moreover, the row decoder 135 may provide the second compensatory voltage 420-3 to the adjacent word lines 110-1 and 110-3 during the programming period 410.

As shown in the depicted embodiment, the row decoder 135 may provide the first compensatory voltage 420-2 and/or the second compensatory voltage 420-3 when providing the selection voltage 420-1 to the target memory cell 105-2. The remaining word line 110-4 may have a voltage level based on a reference voltage 420-4 (e.g., −1 V, −0.1 V, 0 V, 0.5 V, and so on). In specific cases, the row decoder 135 may provide the reference voltage 420-4 to the remaining word line 110-4.

In different embodiments, the first compensatory voltage 420-2 and the second compensatory voltage 420-3 may have different voltage values. In the depicted embodiment, the first compensatory voltage 420-2 may have a lower voltage value (e.g., lower by 0.1 V, 0.2 V, 0.4 V, and so on) compared to the reference voltage 420-4. Moreover, the second compensatory voltage 420-3 may have a higher voltage value (e.g., higher by 0.1 V, 0.2 V, 0.4 V, and so on) compared to the reference voltage 410-4. In some embodiments, the memory controller 145 may provide control signals causing the row decoder 135 to provide the compensatory voltages 410-2 and 410-3.

Referring now to the graph 395, a storage node voltage 425 may represent a voltage of the storage node 170-2 of the target memory cell 105-2. Moreover, a storage node voltage 430 may represent a voltage of the storage node 170-1, the storage node 170-3, or both associated with the adjacent memory cells 105-1 and/or 105-3. The storage node voltages 425 and 430 may transition between a low voltage 435 and a high voltage 440 as described herein.

During the sensing period 405, a first voltage change 445 of the storage node voltage 425 may represent sensing a logic 0 value and a second voltage change 450 may represent sensing a logic 1 value. A value of the first voltage change 445 and the second voltage change 450 are measured based on a difference between the storage node voltage 425 and the high voltage 440 when the target memory cell 105-2 is selected. For example, the capacitor 125 of the target memory cell 105-2 may induce the first voltage change 445 or the second voltage change 450 on the selected data line 115-1 when the target memory cell 105-2 is selected.

If not compensated for, a first voltage disturbance 455 may cause memory read or write operation failures. The first voltage disturbance 455 may be induced by the parasitic capacitors 175 and/or 180 on the storage nodes 170-1 and/or 170-3. A value of the first voltage disturbance 455 may be measured compared to the low voltage level 435. During the sensing period 405, the row decoder 135 may apply the first compensatory voltage 420-2 to the adjacent word lines 110-1 and 110-3 to reduce the first voltage disturbance 455.

For example, applying the first compensatory voltage 420-2 may induce compensatory voltages by generating the compensatory parasitic capacitors 185 and/or 190 discussed above. As such, the row decoder 135 may reduce the first voltage disturbance 455. Accordingly, the storage node voltage 430 of the storage nodes 170-1 and/or 170-3 may remain at (or near) a desired voltage (e.g., the low voltage 435) to improve memory read or write error rates of the memory array 100.

Similarly, during the programming period 410, a second voltage disturbance 460 may cause memory read or write operation failures if not compensated for. The second voltage disturbance 460 may also be induced by the parasitic capacitors 175 and/or 180 on the storage nodes 170-1 and/or 170-3. A value of the second voltage disturbance 460 may be measured compared to the high voltage level 440. During the programming period 410, the row decoder 135 may apply the second compensatory voltage 420-3 to the adjacent word lines 110-1 and 110-3 to reduce the second voltage disturbance 460.

For example, applying the second compensatory voltage 420-3 may induce compensatory voltages by generating the compensatory parasitic capacitors 185 and/or 190 discussed above. Moreover, the row decoder 135 may reduce the second voltage disturbance 460. As such, the storage node voltage 430 of the storage nodes 170-1 and/or 170-3 may remain at (or near) a desired voltage (e.g., the high voltage 440) to improve memory read or write error rates of the memory array 100. Accordingly, the row decoder 135 may reduce a probability of the memory read or write failures. It should be appreciate that a value of the first compensatory voltage 420-2 and the second compensatory voltage 420-3 may be determined (or predetermined) and stored in a memory (e.g., a lookup table) based on simulation and/or empirical data.

Figure 5:
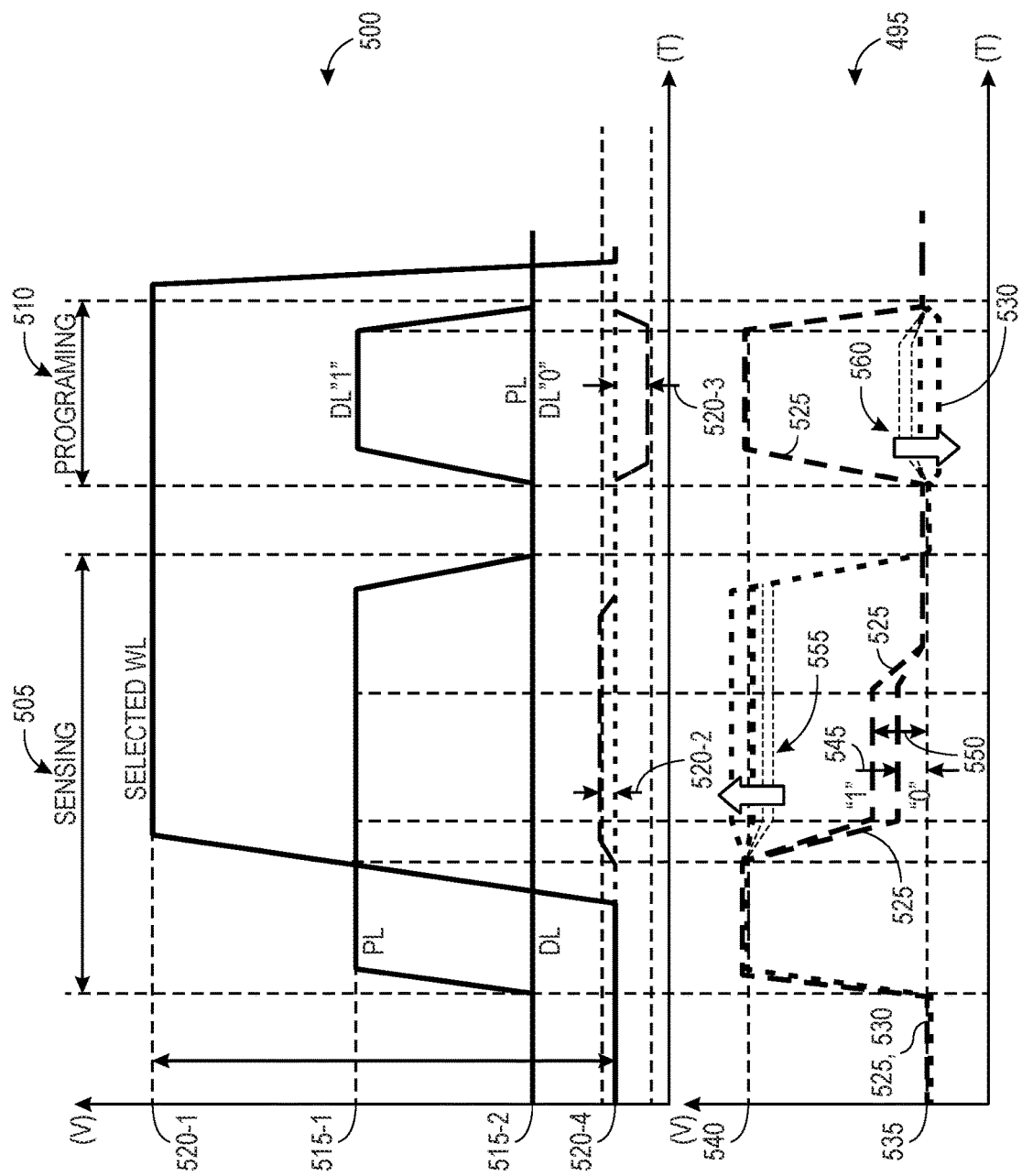
FIG. 5 depicts a graph illustrating voltage levels provided to and received from the memory array of FIG. 1 associated with a low sensing biasing scheme, in accordance with another embodiment of the present disclosure.

FIG. 5 depicts graphs 500 and 550 illustrating voltage levels provided to and received from the memory array 100, respectively, based on performing a low sensing biasing scheme discussed above. A sensing period 505 of the graphs 500 and 495 may illustrate voltage levels provided to and received from the memory array 100, respectively, when sensing a current memory state stored on the target memory cell 105-2. Moreover, a programming period 510 of the graphs 500 and 495 may illustrate voltage levels provided to and received from the memory array 100, respectively, when programming (or reprogramming) the target memory cell 105-2.

For example, the illustrated consecutive sensing period 505 and the programming period 510 may be associated with a destructive sensing operation and a subsequent programming (or reprogramming) operation. It should be appreciated that the depicted embodiment is provided by the way of example. As such, in alternative or additional embodiments, the sensing period 505 and the programming period 510 may be performed with different voltage levels and/or performed individually and separately at different times.

The graph 500 depicts voltage levels provided to the word lines 110, the data lines 115, and the plate line 120 by the row decoder 135 and the column decoder 140 (or any other viable component). Moreover, the graph 495 depicts voltage levels of the storage nodes 170-1, 170-2, and 170-3 of the memory cells 105-1, 105-2, and 105-3 discussed above. For example, the sense component 155 or any other viable component may determine the storage nodes 170-1, 170-2, and 170-3.

With the foregoing in mind, the graph 495 may illustrate induced voltage changes of the storage nodes 170-1, 170-2, and 170-3 when providing the voltages depicted in the graph 500 to the target memory cell 105-2. It should be appreciated that the depicted voltage levels in the graphs 500 and 495 are provided by the way of example and are aligned with dashed lined only for correspondence and visibility. In different embodiments, the voltage levels of the storage nodes 170-1, 170-2, and 170-3 shown in the graph 495 may occur concurrent with or at different times after providing the voltage levels shown in the graph 500.

During the sensing period 505, the column decoder 140 may provide a high data line voltage 515-1 (e.g., 0.7 V, 1.5 V, 3 V, 5 V, and so on) to the data line 115-1 and a low data line voltage 515-2 (e.g., 0 V, 0.1 V, 0.2 V, 0.3 V, and so on) to the remaining data lines 115-2, 115-3, and 115-4. The high data line voltage 515-1 may correspond to the sensing voltage (or the programming voltage) described above. The column decoder 140 may also provide the low data line voltage 515-2 to the plate line 120. Accordingly, the column decoder 140 may generate a voltage difference across the capacitors 125 of the memory cells 105-1, 105-2, 105-3, and 105-4. Moreover, the column decoder 140 may float the non-selected memory cells 105 coupled to the remaining data lines 115-2, 115-3, and 115-4.

During the programming period 510, in different cases, the column decoder 140 may provide the high data line voltage 515-1 or the low data line voltage 515-2 to the data line 115-1. In particular, the column decoder 140 may provide the big data line voltage 515-1 or the low data line voltage 515-2 based on an initial value of the target memory cell 105-2 and the hysteresis curve 200 or 300 discussed above. Moreover, the column decoder 140 may follow the low biasing scheme portion of the hysteresis curve 200 or 300.

In any case, the row decoder 135 may provide a selection voltage 520-1 (e.g., 1.5 V, 3 V, 5 V, 5.5 V, and so on) to the target word line 110-2 during the sensing period 505, the programming period 510, or both. The row decoder 135 may provide the selection voltage 520-1 for sensing the current memory state stored on the target memory cell 105-2 and programming a desired memory state stored on the target memory cell 105-2. For example, the row decoder 135 may provide the selection voltage 520-1 to the gate of the switch 130 of the target memory cell 105-2 to electrically couple the capacitor 125 of the target memory cell 105-2 to the data line 115-1. Accordingly, in the illustrated embodiment, the column decoder 140 and the row decoder 135 may select the target memory cell 105-2 during the sensing period 505 and the programming period 510.

If not compensated for, in some cases, selecting the target memory cell 105-2 may cause forming the undesired parasitic capacitors 175 and/or 180 described above. As such, the row decoder 135 may provide the first compensatory voltage 520-2 and/or the second compensatory voltage 520-3 to reduce an effect of the undesired parasitic capacitors 175 and/or 180. In particular, the row decoder 135 may provide the first compensatory voltage 520-2 to the adjacent word lines 110-1 and 110-3 during the sensing period 505. Moreover, the row decoder 135 may provide the second compensatory voltage 520-3 to the adjacent word lines 110-1 and 110-3 during the programming period 510.

As shown in the depicted embodiment, the row decoder 135 may provide the first compensatory voltage 520-2 and/or the second compensatory voltage 520-3 when providing the selection voltage 520-1 to the target memory cell 105-2. The remaining word line 110-4 may have a voltage level based on a reference voltage 520-4 (e.g., −1 V, −0.1 V, 0 V, 0.5 V, and so on). In specific cases, the row decoder 135 may provide the reference voltage 520-4 to the remaining word line 110-4.

In different embodiments, the first compensatory voltage 520-2 and the second compensatory voltage 520-3 may have different voltage values. In the depicted embodiment, the first compensatory voltage 520-2 may have a higher voltage value (e.g., higher by 0.1 V, 0.2 V, 0.4 V, and so on) compared to the reference voltage 520-4. Moreover, the second compensatory voltage 520-3 may have a lower voltage value (e.g., lower by 0.1 V, 0.2 V, 0.4 V, and so on) compared to the reference voltage 510-4. In some embodiments, the memory controller 145 may provide control signals causing the row decoder 135 to provide the compensatory voltages 510-2 and 510-3.

Referring now to the graph 495, a storage node voltage 525 may represent a voltage of the storage node 170-2 of the target memory cell 105-2. Moreover, a storage node voltage 530 may represent a voltage of the storage node 170-1 of the adjacent memory cells 105-1, the storage node 170-3 of the adjacent memory cells 105-3, or both. The storage node voltages 525 and 530 may transition between a low voltage 535 and a high voltage 540 as described herein.

During the sensing period 505, a first voltage change 545 of the storage node voltage 525 may represent sensing a logic 0 value and a second voltage change 550 may represent sensing a logic 1 value. A value of the first voltage change 545 and the second voltage change 550 are measured based on a difference between the storage node voltage 525 and the high voltage 540 when the target memory cell 105-2 is selected. For example, the capacitor 125 of the target memory cell 105-2 may induce the first voltage change 545 or the second voltage change 550 on the selected data line 115-1 when the target memory cell 105-2 is selected.

If not compensated for, a first voltage disturbance 555 may cause memory read or write operation failures. The first voltage disturbance 555 may be induced by the parasitic capacitors 175 and/or 180 on the storage nodes 170-1 and/or 170-3. A value of the first voltage disturbance 555 may be measured compared to the low voltage level 535. During the sensing period 505, the row decoder 135 may apply the first compensatory voltage 520-2 to the adjacent word lines 110-1 and 110-3 to reduce the first voltage disturbance 555.

For example, applying the first compensatory voltage 520-2 may induce compensatory voltages by generating the compensatory parasitic capacitors 185 and/or 190 discussed above. As such, the row decoder 135 may reduce the first voltage disturbance 555. Accordingly, the storage node voltage 530 of the storage nodes 170-1 and/or 170-3 may remain at (or near) a desired voltage (e.g., the low voltage 535) to improve memory read or write error rates of the memory array 100.

Similarly, during the programming period 510, a second voltage disturbance 560 may cause memory read or write operation failures if not compensated for. The second voltage disturbance 560 may also be induced by the parasitic capacitors 175 and/or 180 on the storage nodes 170-1 and/or 170-3. A value of the second voltage disturbance 560 may be measured compared to the high voltage level 540. During the programming period 510, the row decoder 135 may apply the second compensatory voltage 520-3 to the adjacent word lines 110-1 and 110-3 to reduce the second voltage disturbance 560.

For example, applying the second compensatory voltage 520-3 may induce compensatory voltages by generating the compensatory parasitic capacitors 185 and/or 190 discussed above. Moreover, the row decoder 135 may reduce the second voltage disturbance 560. As such, the storage node voltage 530 of the storage nodes 170-1 and/or 170-3 may remain at (or near) a desired voltage (e.g., the high voltage 540) to improve memory read or write error rates of the memory array 100. Accordingly, the row decoder 135 may reduce a probability of the memory read or write failures. It should be appreciate that a value of the first compensatory voltage 520-2 and the second compensatory voltage 520-3 may be determined (or predetermined) and stored in a memory (e.g., a lookup table) based on simulation and/or empirical data.

In some embodiments, the row decoder 135 and the column decoder 140 of FIG. 1 described above may include driver circuitry that may provide the multiple reference voltage levels to the word lines 110 and the data lines 115. Some embodiments associated with the driver circuitry of the row decoder 135 are described below with respect to FIGS. 6 and 7.

Figure 6:
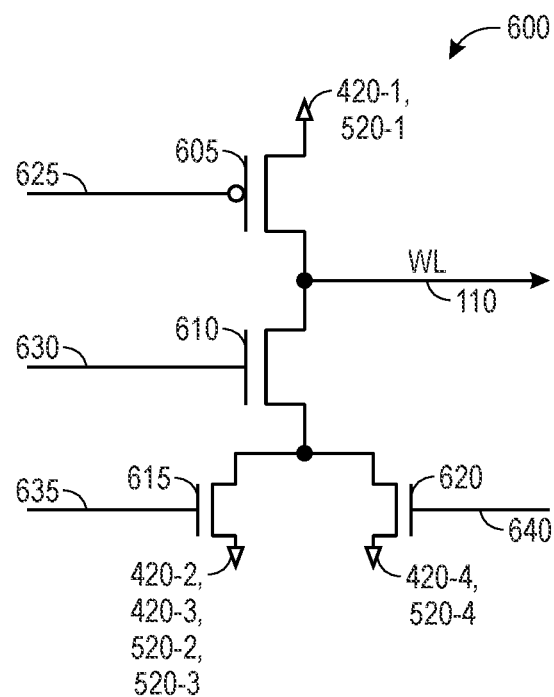
FIG. 6 depicts a schematic of a first driver circuit of the row decoder of the memory array of FIG. 1 having three voltage supplies, in accordance with an embodiment of the present disclosure.

FIG. 6 depicts a schematic of a first driver circuit 600 of the row decoder 135. The row decoder 135 may include multiple driver circuits 600 coupled to the word lines 110. The first driver circuit 600 is associated with at least one word line 110 of the memory array 100. In the high sensing scheme, the first driver circuit 600 may provide the selection voltage 420-1, one of the first compensatory voltage 420-2 and the second compensatory voltage 420-3, or the reference voltage 420-4 to the word lines 110. Alternatively or additionally, in the low sensing scheme, the first driver circuit 600 may provide the selection voltage 520-1, one of the first compensatory voltage 520-2 and the second compensatory voltage 520-3, or the reference voltage 520-4 to the word lines 110.

In some embodiments, the first driver circuit 600 may provide either the first compensatory voltage 420-2 or the second compensatory voltage 420-3 when performing the high biasing scheme. Alternatively or additionally, the first driver circuit 600 may provide either the first compensatory voltage 520-2 or the second compensatory voltage 520-3 when performing the high biasing scheme. For example, in such embodiments, the first compensatory voltage 420-2 and the second compensatory voltage 420-3 may have the same voltage level, the first compensatory voltage 520-2 and the second compensatory voltage 520-3, or both.

In any case, the first driver circuit 600 may include a first switch 605, a second switch 610, a third switch 615, and a fourth switch 620 to control whether to provide the selection voltage 420-1, one of the first compensatory voltage 420-2 and the second compensatory voltage 420-3, or the reference voltage 420-4 to the word lines 110. In some embodiments, the memory controller 145 of FIG. 1, or any other viable controller or processor, may provide control signals to the first driver circuit 600. For example, the memory controller 145 may provide the control signals to the first switch 605, the second switch 610, the third switch 615, and the fourth switch 620 to cause provision of the selection voltage 420-1, one of the first compensatory voltage 420-2 and the second compensatory voltage 420-3, or the reference voltage 420-4 to the word line 110. In particular, the memory controller 145 may provide a first control signal 625 to switch on or off the first switch 605, a second control signal 630 to switch on or off the second switch 610, a third control signal 635 to switch on or off the third switch 615, and a fourth control signal 640 to switch on or off the fourth switch 620.

Moreover, although a specific embodiment of the first driver circuit 600 is illustrated, in different embodiments, the first driver circuit 600 may include a different circuitry, switches, and/or routing for providing the selection voltage 420-1 (or 520-1), one of the first compensatory voltage 420-2 (or 520-2) and the second compensatory voltage 420-3 (or 520-3), or the reference voltage 420-4 (or 520-4) to the word line 110. Furthermore, in different embodiments, the first switch 605, the second switch 610, the third switch 615, and the fourth switch 620 may each include different types of MOSFETs, transistors, or any other viable switching mechanism. As such, each of the the row decoder 135 may in the row decoder 135 may provide a voltage based on the graphs 400, 395, 500, and 495 and/or hysteresis curves 200 or 300 described above to the word line 110 to reduce the undesired parasitic capacitance of the memory array 100. Accordingly, the row decoder 135 may include the row decoder 135 to reduce a magnitude or value of the voltage disturbances 455, 460, 555, and/or 560.

Figure 7:
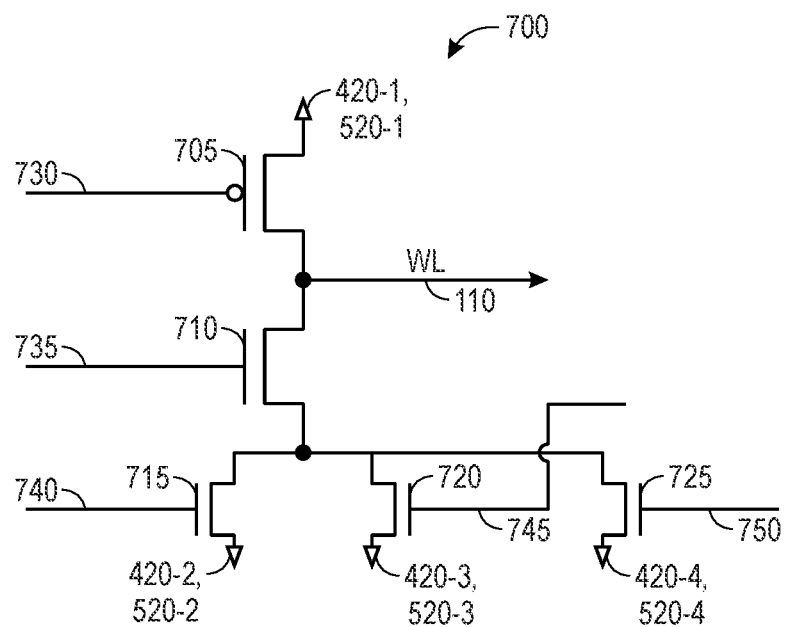
FIG. 7 depicts a schematic of a first driver circuit of the row decoder of the memory array of FIG. 1 having four voltage supplies, in accordance with an embodiment of the present disclosure.

FIG. 7 depicts a schematic of a second driver circuit 700 of the row decoder 135. In some embodiments, the row decoder 135 may include multiple driver circuits 700 coupled to the word lines 110. The second driver circuit 700 is associated with at least one word line 110 of the memory array 100. In the high sensing scheme, the second driver circuit 700 may provide the selection voltage 420-1, the first compensatory voltage 420-2, the second compensatory voltage 420-3, or the reference voltage 420-4 to the word lines 110. Alternatively or additionally, in the low sensing scheme, the second driver circuit 700 may provide the selection voltage 520-1, the first compensatory voltage 520-2, the second compensatory voltage 520-3, or the reference voltage 520-4 to the word lines 110.

The second driver circuit 700 may include a first switch 705, a second switch 710, a third switch 715, a fourth switch 720, and a fifth switch 725 to control whether to provide the selection voltage 420-1 (or 520-1), the first compensatory voltage 420-2 (or 520-2), the second compensatory voltage 420-3 (or 520-3), or the reference voltage 420-4 (or 520-4) to the word lines 110 coupled thereto. In some embodiments, the memory controller 145 of FIG. 1, or any other viable controller or processor, may provide control signals to the second driver circuit 700.

For example, the memory controller 145 may provide the control signals to the first switch 705, the second switch 710, the third switch 715, the fourth switch 720, and the fifth switch 725 to cause provision of the selection voltage 420-1

(or 520-1), the first compensatory voltage 420-2 (or 520-2), the second compensatory voltage 420-3 (or 520-3), or the reference voltage 420-4 (or 520-4) to the word line 110. In particular, the memory controller 145 may provide a first control signal 730 to switch on or off the first switch 705, a second control signal 735 to switch on or off the second switch 710, a third control signal 740 to switch on or off the third switch 715, a fourth control signal 745 to switch on or off the fourth switch 720, and a fifth control signal 750 to switch on or off the fourth switch 725.

Moreover, although a specific embodiment of the second driver circuit 700 is illustrated, in different embodiments, the second driver circuit 700 may include a different circuitry, switches, and/or routing for providing the selection voltage 420-1 (or 520-1), the first compensatory voltage 420-2 (or 520-2), the second compensatory voltage 420-3 (or 520-3), or the reference voltage 420-4 (or 520-4) to the word line 110. Furthermore, in different embodiments, the first switch 705, the second switch 710, the third switch 715, the fourth switch 720, and the fifth switch 725 may each include different types of MOSFET's, transistors, or any other viable switching mechanism. As such, each of the row decoders 135 of the row decoder 135 may provide a voltage based on the graphs 400, 395, 500, and 495 and/or hysteresis curves 200 or 300 described above to the word line 110 to reduce the undesired parasitic capacitance of the memory array 100. Accordingly, the row decoder 135 may include the row decoder 135 to reduce a magnitude or value of the voltage disturbances 455, 460, 555, and/or 560.

Figure 8:
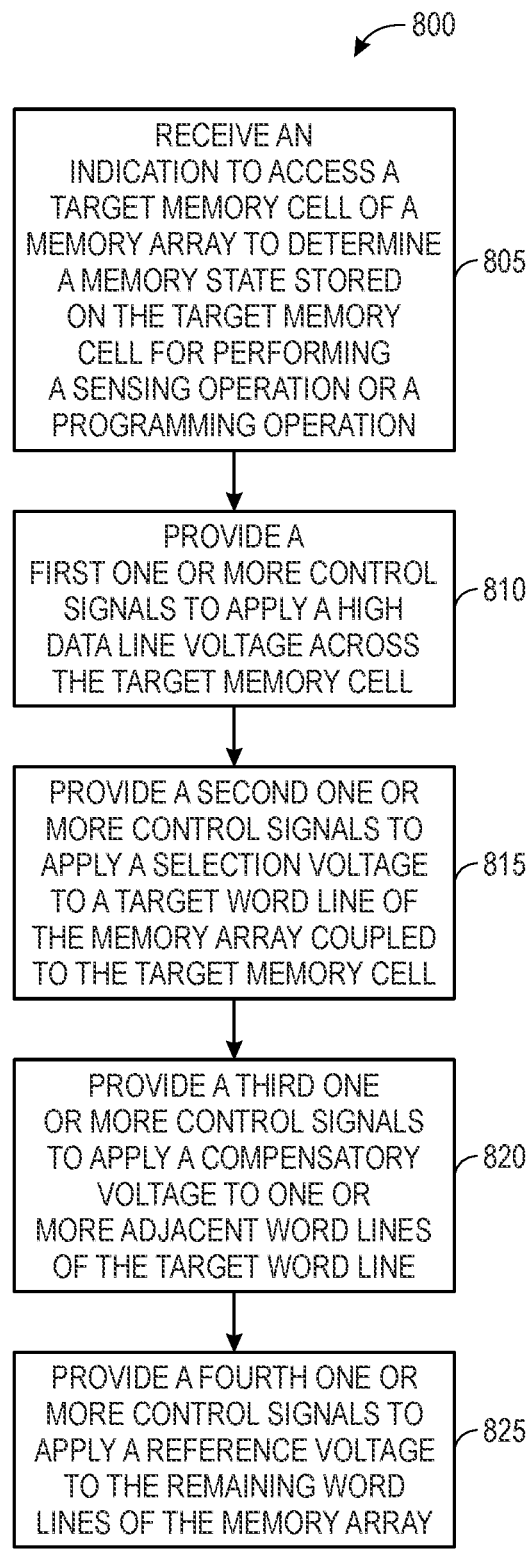
FIG. 8 depicts a process for accessing a target memory cell of the memory array of FIG. 1 during a sensing operation or a programming operation, in accordance with an embodiment of the present disclosure.

With the foregoing in mind, FIG. 8 is a process 800 for accessing the target memory cell 105-2 of the memory array 100 during a sensing operation or a programming operation. For example, the process 800 may be associated with accessing the target memory cell 105-2 during a read operation or a write operation. Moreover, the memory controller 145 discussed above or any other viable processor or controller may perform operations of the process 800. Although specific blocks are described in a particular order in the process 800, it should be appreciated that in alternative or additional embodiments, the process 800 may include additional or less blocks and/or performed at any viable order.

At block 805, the memory controller 145 may receive an indication to access the target memory cell 105-2 to determine a memory state stored on the target memory cell. The indication to access the target memory cell 105-2 may be associated with performing a sensing operation or a programming operation. Moreover, the sensing operation or the programming operation may each be associated with a read operation or a write operation.

At block 810, the memory controller 145 may provide a first one or more control signals to apply a high data line voltage across the target memory cell 105-2. For example, the memory controller 145 may provide the first one or more control signals to the column decoder 140. Moreover, the column decoder 140 may apply the high data line voltage 415-1 or 515-1 discussed above based on the hysteresis curve 200 or 300 to the target data line 115-1 or the plate line 120 coupled to the target memory cell 105-2.

At block 815, the memory controller 145 may provide a second one or more control signals to apply a selection voltage to the target word line 110-2 coupled to the target memory cell 105-2. For example, the memory controller 145 may provide the second one or more control signals to the row decoder 135. Moreover, the row decoder 135 may apply the selection voltage 420-1 or 520-1 discussed above based on the hysteresis curve 200 or 300 to the target word line 110-2 coupled to the target memory cell 105-2.

At block 820, the memory controller 145 may provide a third one or more control signals to apply a compensatory voltage to the adjacent word lines 110-1 and 110-3 of the target word line 110-2. For example, the memory controller 145 may provide the third one or more control signals to the row decoder 135. Moreover, the row decoder 135 may apply the compensatory voltage 420-2, 420-3, 520-2, or 520-3 discussed above to the adjacent word line 110-2.

At block 825, the memory controller 145 may provide a fourth one or more control signals to apply a reference voltage to the remaining word line 110-4 of the target word line 110-2. For example, the memory controller 145 may provide the fourth one or more control signals to the row decoder 135. Moreover, the row decoder 135 may apply the reference voltage 420-4 or 520-4 discussed above to the remaining word line 110-4. As mentioned above, the compensatory voltage may be higher or lower than the reference voltage to reduce an effect of the undesired parasitic capacitors 175 and/or 180 discussed above. For example, the memory controller 145 may determine the compensatory voltage based on referring to a lookup table stored in a memory. In any case, the memory controller 145 may provide the control signals to reduce the undesired voltage disturbance 455, 460, 555, and/or 560 discussed above when accessing the target memory cell 105-2.

Technical effects of the described ferroelectric memory array include lower error ratio which in turn may result in higher product reliability. With these technical effects in mind, multiple ferroelectric memory arrays may be included on a memory device, which in turn may be included in a memory module. Moreover, a memory controller may be used on the host-side of a memory-host interface; for example, a processor, microcontroller, field programmable gate array (FPGA), application-specific integrated circuit (ASIC), or the like may each include a memory controller.

This communication network may enable data communication there between and, thus, the client device to utilize hardware resources accessible through the memory controller. Based at least in part on user input to the client device, processing circuitry of the memory controller may perform one or more operations to facilitate the retrieval or transmission of data using multiple memory states between the client device and the memory devices. Data communicated between the client device and the memory devices may be used for a variety of purposes including, but not limited to, presentation of a visualization to a user through a graphical user interface (GUI) at the client device, processing operations, calculations, or the like. Thus, with this in mind, the above-described improvements to memory, memory controller operations, and memory writing operations may manifest as improvements in visualization quality (e.g., speed of rendering, quality of rendering), improvements in processing operations, improvements in calculations, or the like.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A memory array, comprising:
a plurality of word lines;
a plurality of data lines;
a plate line;
a plurality of memory cells, wherein a target memory cell of the plurality of memory cells is coupled to a target data line of the plurality of data lines, a target word line of the plurality of word lines, and the plate line;
a column decoder configured to apply a data line voltage across the target memory cell via the target data line and the plate line; and
a row decoder configured to:
provide a selection voltage to the target word line;
provide a first compensatory voltage to at least one adjacent word line of the plurality of word lines adjacent to the target word line; and
provide a reference voltage to one or more remaining word lines of the plurality of word lines.

2. The memory array of claim 1, wherein the column decoder is configured to apply the data line voltage across the target memory cell and the row decoder is configured to apply the selection voltage to the target word line to select the target memory cell.

3. The memory array of claim 2, wherein selecting the target memory cell is associated with a memory read operation or memory write operation.

4. The memory array of claim 1, wherein a memory controller associated with the memory array is configured to receive first one or more control signals indicative of selecting the target memory cell.

5. The memory array of claim 4, wherein the memory controller is configured to provide second one or more control signals to the row decoder indicative of providing the data line voltage and the first compensatory voltage in response to receiving the first one or more control signals.

6. The memory array of claim 1, wherein the row decoder is configured to provide the first compensatory voltage during a sensing operation and provide a second compensatory voltage to the at least one adjacent word line during a subsequent sensing operation or a programming operation.

7. The memory array of claim 1, wherein a voltage value of the first compensatory voltage is determined based on referencing a predetermined value stored on a lookup table.

8. The memory array of claim 1, wherein the target memory cell comprises a ferroelectric capacitor.

9. The memory array of claim 1, wherein the row decoder comprises a driver circuit, wherein the driver circuit is configured to receive one or more control signals to:
provide the selection voltage to the target word line;
provide the first compensatory voltage to the at least one adjacent word line; and
provide the reference voltage to the one or more remaining word lines.

10. A memory device, comprising:
a memory controller configured to provide a first one or more control signals to access a memory state stored on a target memory cell, program a memory state on the target memory cell, or both;
a memory array coupled to the memory controller, the memory array comprising:
a plurality of word lines;
a plurality of data lines;
a plate line;
a plurality of memory cells comprising the target memory cell, wherein the target memory cell is coupled to a target data line of the plurality of data lines, a target word line of the plurality of word lines, and the plate line;
a column decoder configured to apply a data line voltage across the target memory cell via the target data line and the plate line based on receiving the first one or more control signals; and
a row decoder configured to:
provide a selection voltage to the target word line based on receiving the first one or more control signals;
provide a first compensatory voltage to at least one adjacent word line of the plurality of word lines adjacent to the target word line based on receiving the first one or more control signals; and
provide a reference voltage to one or more remaining word lines of the plurality of word lines based on receiving the first one or more control signals.

11. The memory device of claim 10, wherein the column decoder is configured to apply the data line voltage and the row decoder is configured to apply the selection voltage to select the target memory cell for one of accessing a memory state stored on the target memory cell and programing a memory state on the target memory cell.

12. The memory device of claim 10, wherein the first one or more control signals are associated with performing a memory read operation or a memory write operation.

13. The memory device of claim 12, wherein the memory controller is configured to provide a subsequent one or more control signals to reprogram a memory state on the target memory cell after a destructive memory read operation, wherein the row decoder is configured to:
provide a subsequent selection voltage to the target word line based on receiving the subsequent one or more control signals;
provide a second compensatory voltage to the at least one adjacent word line based on receiving the subsequent one or more control signals.

14. The memory device of claim 10, wherein the memory controller is configured to provide the first one or more control signals indicative of a voltage value of the first compensatory voltage based on referencing a lookup table.

15. The memory device of claim 10, wherein the target memory cell comprises a ferroelectric capacitor.

16. A method, comprising:
receiving, by a memory controller of a ferroelectric memory array, an indication to access a target memory cell of a memory array to determine a memory state stored thereon;
providing, by the memory controller, a first one or more control signals indicative of applying a high data line voltage across the target memory cell;
providing, by the memory controller, a second one or more control signals indicative of applying a selection voltage to a target word line of the memory array coupled to the target memory cell;
providing, by the memory controller, a third one or more control signals indicative of applying a compensatory voltage to one or more adjacent word lines of the target word line; and providing, by the memory controller, a fourth one or more control signals indicative of applying a reference voltage to the remaining word lines of the memory array.

17. The method of claim 16, wherein determining the memory state stored on the target memory cell is associated with performing one of a programming operation and a sensing operation.

18. The method of claim 16, wherein the memory controller provides the first one or more control signals to a column decoder of the memory array to apply the high data line voltage.

19. The method of claim 16, wherein the memory controller provides the second one or more control signals, the third one or more control signals, and the fourth one or more control signals.

20. The method of claim 19, comprising referencing, by the memory controller, a lookup table, to determine the third one or more control signals based on the selection voltage.

* * * * *